US012626506B2

(12) United States Patent
Cong et al.

(10) Patent No.: US 12,626,506 B2
(45) Date of Patent: May 12, 2026

(54) METHOD AND SYSTEM FOR DETECTING CHANGES IN AREAS

(71) Applicant: SHANDONG UNIVERSITY, Shandong (CN)

(72) Inventors: Runmin Cong, Jinan (CN); Zifeng Qiu, Jinan (CN); Wei Zhang, Jinan (CN); Ran Song, Jinan (CN); Liangbin Zhu, Jinan (CN); Yu Chen, Jinan (CN); Taoyi Chen, Jinan (CN); Xiaolei Li, Jinan (CN)

(73) Assignee: SHANDONG UNIVERSITY, Jinan (CN)

( * ) Notice: Subject to any disclaimer, the term of this patent is extended or adjusted under 35 U.S.C. 154(b) by 0 days.

(21) Appl. No.: 18/983,781

(22) Filed: Dec. 17, 2024

(65) Prior Publication Data

US 2025/0118068 A1     Apr. 10, 2025

Related U.S. Application Data

(63) Continuation-in-part of application No. PCT/CN2024/086997, filed on Apr. 10, 2024.

(30) Foreign Application Priority Data

Aug. 4, 2023     (CN) .......................... 202310983540.5

(51) Int. Cl.
G06V 20/17          (2022.01)
G06T 5/50           (2006.01)
          (Continued)

(52) U.S. Cl.
CPC ............... G06V 20/17 (2022.01); G06T 5/50 (2013.01); G06T 7/194 (2017.01); G06V 10/44 (2022.01);
          (Continued)

(58) Field of Classification Search
CPC . G06T 2207/10032; G06T 2207/20081; G06T 2207/20084; G06T 2207/20221;
          (Continued)

(56) References Cited

U.S. PATENT DOCUMENTS

| | | | |
|---|---|---|---|
| 11,055,872 B1 * | 7/2021 | Chen ........................ | G06N 3/02 |
| 2012/0224772 A1 | 9/2012 | Mitchell et al. | |
| 2022/0398840 A1 * | 12/2022 | Dhawan .................. | G08G 5/56 |

FOREIGN PATENT DOCUMENTS

| | | | |
|---|---|---|---|
| CN | 113609896 A | | 11/2021 |
| CN | 114330518 A | * | 4/2022 |

(Continued)

OTHER PUBLICATIONS

Jul. 11, 2024 International Search Report issued in International Patent Application No. PCT/CN2024/086997.

(Continued)

*Primary Examiner* — Peet Dhillon
(74) *Attorney, Agent, or Firm* — Oliff PLC

(57)          ABSTRACT

The present invention provides a method and system for detecting changes in areas, comprising: acquiring images at different times of an area by low-altitude UAVs; extracting state features for each of backbone feature pairs; analyzing importance of each of state parts due to the state parts have different importance degrees to the whole image features under different scenes; eliminating the state features from complete features by virtue of differences in importance degrees, to obtain corresponding essential parts; determining at least one change in the area by analyzing the essential parts. The invention comprehensively considers the importance of the state parts in the input images, and the essential parts contains complete and pure information are obtained, which reflects an actual changed region.

7 Claims, 2 Drawing Sheets

(51) Int. Cl.
| | |
|---|---|
| *G06T 7/194* | (2017.01) |
| *G06V 10/44* | (2022.01) |
| *G06V 10/80* | (2022.01) |

(52) U.S. Cl.
CPC .. *G06V 10/806* (2022.01); *G06T 2207/20081* (2013.01); *G06T 2207/20084* (2013.01); *G06T 2207/20221* (2013.01)

(58) Field of Classification Search
CPC ........... G06T 5/50; G06T 7/194; G06T 7/254; G06V 20/13; G06V 20/17; G06V 10/40; G06V 10/44; G06V 10/82; G06V 10/774; G06V 10/806; Y02T 10/40
See application file for complete search history.

(56) References Cited

FOREIGN PATENT DOCUMENTS

| | | | | | |
|---|---|---|---|---|---|
| CN | 114519383 | A | * | 5/2022 | ........... G06F 18/253 |
| CN | 112365462 | B | * | 10/2022 | ........... G06F 18/254 |
| CN | 115546671 | A | | 12/2022 | |
| CN | 115909112 | A | | 4/2023 | |
| CN | 116012364 | A | | 4/2023 | |
| CN | 117173104 | A | | 12/2023 | |

OTHER PUBLICATIONS

Jul. 11, 2024 Written Opinion issued in International Patent Application No. PCT/CN2024/086997.

* cited by examiner

METHOD AND SYSTEM FOR DETECTING CHANGES IN AREAS

CROSS-REFERENCE TO RELATED APPLICATION

This application is a continuation-in-part of international PCT application serial no. PCT/CN2024/086997, filed on Apr. 10, 2024, which claims priority benefit of China application no. 202310983540.5, filed on Aug. 4, 2023. The entirety of each of the above-mentioned patent applications is hereby incorporated by reference herein and made a part of this specification.

TECHNICAL FIELD

The present invention belongs to the technical field of computer vision, and particularly relates to a method and system for detecting changes in areas.

BACKGROUND

The statements in this section merely provide background information related to the present invention and do not necessarily constitute prior art.

Change detection is a task aimed at locating and segmenting changing regions in pairs of images acquired at different times, and is important in many fields, such as urban supervision, disaster assessment and desert governance. Due to the wide application and great potential of this task, more and more methods have been proposed to solve the tasks of the change detection. In some early representative works, solve this task is solved by using traditional methods, while gradually improving performance. In recent years, deep learning (DL) models have been widely used in computer vision tasks, further stimulating researchers' interest in using the DL models to solve the tasks of the change detection. Since 2015, methods of change detection based on DL have evolved rapidly. Some existing methods introduce more innovative models, which consecutively refreshes the state-of-the-art performance of change detection or its sub-tasks.

The data of change detection in images from low-altitude unmanned aerial vehicles (UAVs) are the images of street view taken by low-altitude imaging devices (such as drones), which play an important role in supporting the construction of smart cities. Compared with the task of change detection based on remote sensing, a diversity of objects and scenes in the change detection based on the low-altitude UAVs is higher, which means that more diverse and complex changes will occur, which is undoubtedly a more challenging task. In addition to meteorological conditions, the change detection based on the low-altitude UAVs also faces difficulties caused by obstruction from buildings, shadows of different shapes and depths, and complex and ever-changing artificial lighting. In order to achieve high quality detections, models must be able to identify essential changes and avoid the adverse effects described above as much as possible.

Since each set of inputs consists of two images in the change detection based on the low-altitude UAVs, some of the previous work naturally applies twin convolutional neural networks to extract features. In a narrow sense, a twin convolutional neural network consists of two convolutional neural networks that share weights. When two input images respectively pass through each one of the two convolutional neural networks, features in the two images will be extracted in the same form. Ideally, the same regions are still similar in a feature map, and different regions may be represented as different features, making it easier to find changing regions between the two images (a pair of images) and meets the objective requirements of the task.

However, all previous work using the twin convolutional neural networks has focused on how to correctly fuse feature pairs or amplify feature differences in changing regions, making them easier to locate. While these ideas help obtain higher quality change maps (actually, they do improve performance), but another key point has been overlooked, that is, finding changing regions in one task of change detection based on the low-altitude UAVs does not mean that all differences between the two images may be concerned. Usually, the changing regions to be found in the street view images taken by the low-altitude UAVs include two-dimensional (2D) changes in a surface of objects (such as murals on walls) and three-dimensional (3D) changes (such as the appearance, disappearance or movement of objects). It should be noted that changes caused by different lighting, shading, or color styles are considered to be different states of the same essence, i.e., "state changes." Even if they are essentially the same, different states can lead to very large differences in representation, which can interfere with the model's prediction of the correct change map. Therefore, how to get rid of the influence of the state changes, only pay attention to the essential change, and improve the accuracy of the change detection based on the low-altitude UAVs is an urgent problem to be solved in the art.

SUMMARY

In order to overcome the shortcomings of the prior art, the present invention provides a method and system for detecting changes in areas, decoupling backbone features into essential parts and state parts, which makes a function unit of decoding focus more on predicting a real change map, and an accuracy of detecting changes in area based on low-altitude UAV is improved.

To achieve the above object, a first aspect of the present invention provides a method for detecting changes in areas, comprising:

acquiring images at different times of an area to be detected by using a low-altitude UAV;

inputting the images acquired at different times into a trained change detection model to obtain a result of change detection of images of the area to be detected; and determining at least one changing feature of the area to be detected by analyzing the result of change detection of images of the area to be detected; wherein, the images acquired at different times of the area to be detected by using the low-altitude UAV, comprising:

a pre-event image, obtained by shooting the area to be detected at a spatial point and a shooting angle by using the low-altitude UAV through an UAV control algorithm and a GPS positioning technology; wherein, the spatial point and the shooting angle is recorded; and, a post-event image, obtained by shooting the area to be detected again after a predetermined time interval, at the recorded spatial points and shooting angles by using the low-altitude UAV; and the inputting the images acquired at different times into the trained change detection model to obtain the result of change detection of images of the area to be detected, comprising:

extracting backbone features from the images acquired at different times to obtain multilevel backbone feature pairs;

extracting state features from the multilevel backbone feature pairs to obtain state feature pairs; obtaining state feature weights based on importance degrees of the state features in the images acquired at different times; and, obtaining essential feature pairs according to the state feature pairs, the backbone feature pairs, and the state feature weights corresponding to the state feature pairs respectively; and performing a cascade fusion on different the essential feature pairs to obtain the result of change detection of images of the area to be detected.

A second aspect of the present invention provides a system for detecting changes in area, comprising:

a low-altitude UAV with an image capture apparatus, configured to: shoot a pre-event image and a post-event image of an area to be detected at different times and at a constant shooting angle at a constant space point based on an UAV control algorithm and a GPS positioning technology, to form images acquired at different times (image pair) of the area to be detected by combining the pre-event image with the post-event image;

a data-processing and changing-detection apparatus, configured to: process and input the images acquired at different times into a trained change detection model to obtain a result of change detection of images of the area to be detected; and determining at least one changing feature of the area to be detected by analyzing the result of change detection of images of the area to be detected;

wherein, the data-processing and changing-detection apparatus, comprising:

a function unit of feature extraction, configured to extract backbone features from the images acquired at different times to obtain multilevel backbone feature pairs;

a function unit of interaction decoupling, configured to extract state features from the multilevel backbone feature pairs to obtain state feature pairs; obtain state feature weights based on importance degrees of the state features in the images acquired at different times; and, obtain essential feature pairs according to the state feature pairs, the backbone feature pairs, and the state feature weights; and a function unit of decoding, configured to perform a cascade fusion on different the essential feature pairs to obtain the result of change detection of images of the area to be detected.

A third aspect of the present invention provides a computer device, wherein the computer device comprises a processor, a memory, and a bus, wherein the memory storing machine-readable instructions executable by the processor, the processor communicating with the memory via the bus when the computer device is operating; when the machine-readable instructions are executed by the processor, implementing a method for detecting changes in areas.

A fourth aspect of the present invention provides a non-transitory computer-readable storage medium having a computer program stored thereon; wherein, when the computer program is executed by a processor, implementing a method for detecting changes in areas.

One or more of the above technical solutions have the following beneficial effects:

According to the present invention, firstly, extraction of state features is performed for each pair of backbone features, and because the importance of state parts to the whole image features is different in different scenes, the importance of each state parts is analyzed, and the state features are eliminated from the complete features by virtue of the difference in importance, so that corresponding essential parts are obtained; considering the importance of the input image and the state parts comprehensively, the obtained essential parts will contain complete and pure information, which can reflect the actual changing regions, then the essential pairs reflecting the actual changing regions are input to the function unit of decoding, to calculate the difference between each pair of the essential pairs, so that the function unit of decoding can focus more on predicting the real change map, and improve the accuracy of change detection of images based on low altitude UAV.

Additional aspects of the present invention will be set forth in part in the description which follows, and in part will be obvious from the description, or may be learned by practice of the present invention.

BRIEF DESCRIPTION OF THE DRAWINGS

The accompanying drawings constituting a part of the present invention are used to provide a further understanding of the present invention. The exemplary examples of the present invention and descriptions thereof are used to explain the present invention, and do not constitute an improper limitation of the present invention.

DETAILED DESCRIPTION

Figure 1:
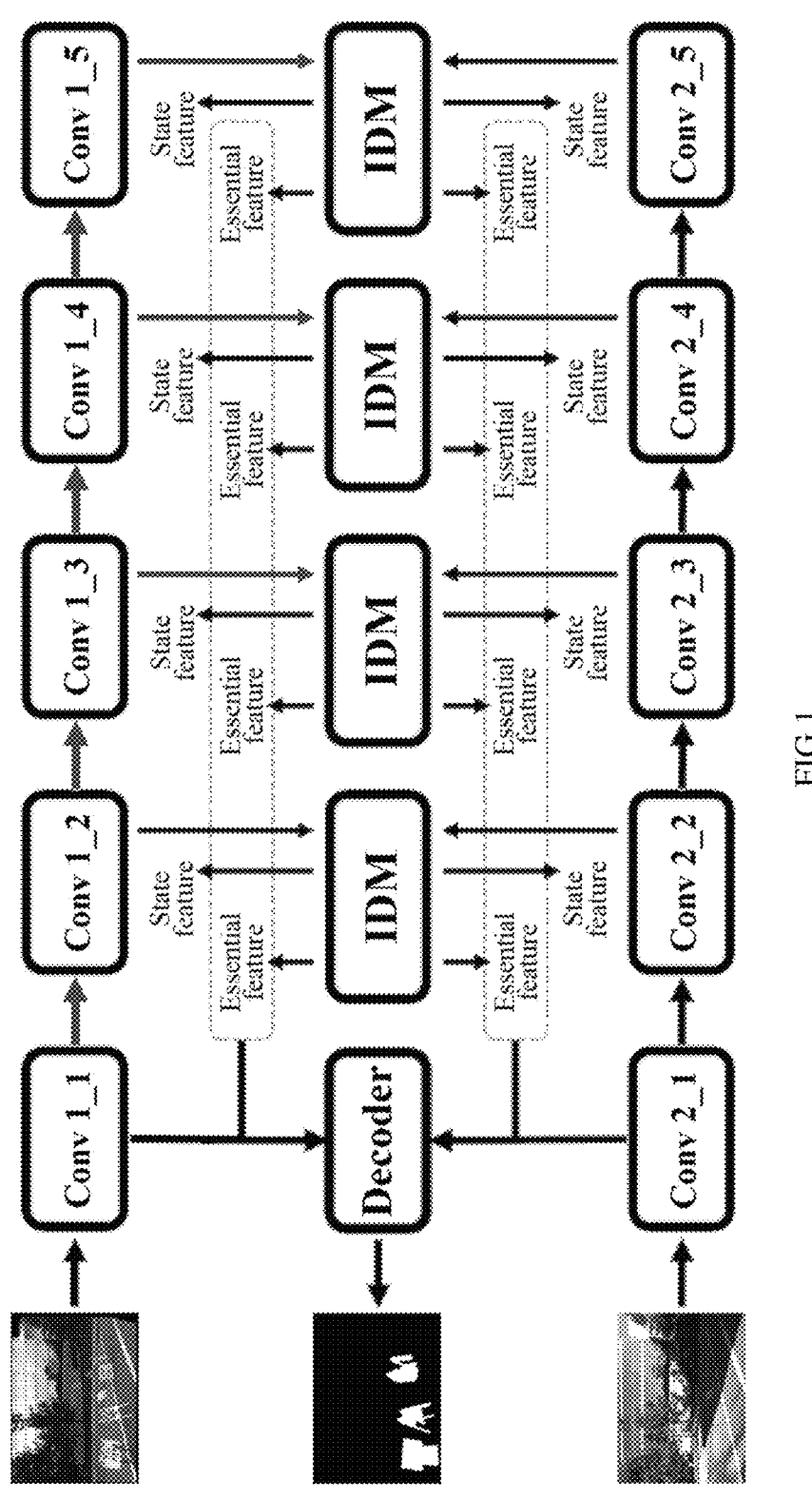
FIG. 1 is a structural diagram of a network of change detection according to Embodiment 1 of the present invention.
Figure 2:
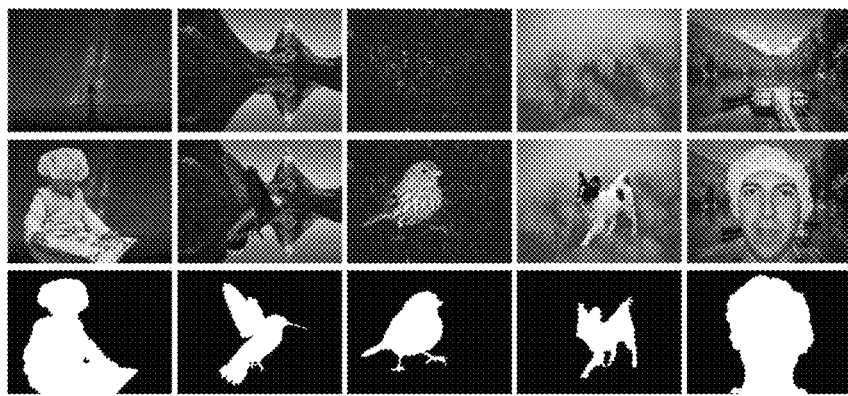
FIG. 2 is a partial view of a virtual data set according to the Embodiment 1 of the present invention.

It should be pointed out that the following detailed descriptions are all illustrative and are intended to provide further descriptions of the present invention. Unless otherwise specified, all technical and scientific terms used in the present invention have the same meanings as those usually understood by a person of ordinary skill in the art to which the present invention belongs.

It should be noted that the terms used here are only for describing specific examples and are not intended to limit exemplary examples according to the present invention.

The embodiments and the features of the embodiments in the present invention may be combined with each other without conflict.

EXPLANATION OF TERMS

Essential changes in images: the changing regions in the images including 2D changes in surfaces of objects, such as murals on walls, and 3D changes, such as the appearance, disappearance, or movement of objects.

State changes in images: the changes caused by different lighting, shading, or color styles are considered to be changes in different states of the same essence.

Embodiment 1

The present embodiment discloses a method for detecting changes in areas, comprising: acquiring images at different times of an area to be detected by using a low-altitude UAV;

inputting the images acquired at different times into a trained change detection model to obtain a result of change detection of images of the area to be detected; and determining at least one changing feature of the area to be detected by analyzing the result of change detection of images of the area to be detected; wherein, the images acquired at different times of the area to be detected by using the low-altitude UAV, comprising:

a pre-event image, obtained by shooting the area to be detected at a spatial point and a shooting angle by using the low-altitude UAV through an UAV control algorithm and a GPS positioning technology; wherein, the spatial point and the shooting angle is recorded; and, a post-event image, obtained by shooting the area to be detected again after a predetermined time interval, at the recorded spatial points and shooting angles by using the low-altitude UAV; and the inputting the images acquired at different times into the trained change detection model to obtain the result of change detection of images of the area to be detected, comprising:

extracting backbone features from the images acquired at different times to obtain multilevel backbone feature pairs;

extracting state features from the multilevel backbone feature pairs to obtain state feature pairs; obtaining state feature weights based on importance degrees of the state features in the images acquired at different times; and, obtaining essential feature pairs according to the state feature pairs, the backbone feature pairs, and the state feature weights corresponding to the state feature pairs respectively; and performing a cascade fusion on different the essential feature pairs to obtain the result of change detection of images of the area to be detected.

As shown in FIG. 1, the input of the essence-state decoupling network proposed in the present embodiment is a pair of images $(x_1, x_2)$ taken at different times $(t_1, t_2)$, and the shooting object is a scene at the same place.

In the present embodiment, first of all, using a twin convolutional neural network composed of two VGG16 networks as a feature extractor of the network, to extract multi-level feature pairs $$\{(F_i^1, F_i^2)\}, i \in \{1, 2, 3, 4, 5\},$$

wherein both the two VGG16 networks are pre-trained on an ImageNet and sharing weights therebetween.

Then, except the first layer of the backbone feature pairs, the other layers of the backbone feature pairs will be sent to a function unit of interactive decoupling, respectively, and will be decoupled into the "state" pairs $$\{(S_i^1, S_i^2)\}, i \in \{2, 3, 4, 5\}$$

and the "essence" pairs $$\{(E_i^1, E_i^2)\}, i \in \{2, 3, 4, 5\}.$$

In the present embodiment, the features of the first layer are not sent to the function unit of interaction decoupling, mainly because the first layer contains too little semantic information and cannot extract much essential information from it. In each module of the function unit of interaction decoupling, the features of two input images are interacted, first generating state parts, then generating a set of weights according to the importance of the state parts in a current scene, and then calculating essential parts through a concise operation process. In this way, the backbone features are decoupled into the state parts and the essential parts. Finally, all essential parts $$\{(E_i^1, E_i^2)\}, i \in \{2, 3, 4, 5\}$$

and the backbone features of the first layer $$(F_1^1, F_1^2)$$

are sent to the decoder to generate the final predicted change map.

In the function unit of interaction decoupling of the present embodiment, decoupling the complete feature pairs in each layer (hierarchy) into the essence pairs and state pairs, then generating the state parts by using global information, and then further dividing essential parts according to the importance of the generated state parts. The input to the each module of the function unit of interaction decoupling is a pair of features in one of the backbone layers.

The function unit of interaction decoupling has two sub-branches, each of which is responsible for one of the features of the pair.

Specifically, giving a pair of image features $$(F_i^1, F_i^2) \in R^{N \times H \times W},$$

where N is a number of channels of the feature, H and W is the spatial resolution size of the feature. The function unit of interaction decoupling first connects the $$F_i^1 \text{ and } F_i^2$$

of the two sub-branches in a cascade manner, and then reduces the number of channels to N again through a 1×1 convolution layer, to generate the state parts $$(S_i^1, S_i^2) \in R^{N \times H \times W}.$$

Since the state parts should focus on the invariant region, the two phase information of the two images is very important, so the method of the present embodiment combines these two features to provide complete information for each sub-branch. Each convolution layer has different weights so that the each sub-branch can label non-important regions of different states in detail. In this way, the obtained state parts will be accurate and help to obtain the features of the essential parts below.

Next, the essential parts are computed by eliminating the state parts from the backbone features. However, subtracting a state part directly from the complete features may not be a good idea. Because there are many different scenes in the images captured by the low-altitude UAV, and all the differences between each of the input image pairs are more or less, not the same. For some input pairs, the invariant regions emphasized by the state part are almost identical, while for others, these regions may be quite different. For this reason, although the state parts can be localized to substantially invariant regions, the state parts contribute differently to the overall semantic change. Therefore, in the present case, the importance of the state parts must be carefully considered in order to correctly obtain the essential parts. Based on this motivation, a method is designed to calculate the importance weights of channels and pixels of each of the state parts and eliminate them from backbone features with the help of the importance weights.

Specifically, in each sub-branch, the complete backbone features and the generated state features are connected in a cascade manner, and then adjusted by the convolutional layer to reach the number of channels that is consistent with the state parts, that is, N channels. In this step, the important channels of the state parts will be further emphasized, which will result in a greater influence of these channels in the final weights. Then two consecutive 3×3 convolutional layers concentrate the information into M channels (M<N), and recover it again to the N channels, so that all channels are thoroughly concentrated. By default, M is set to N/2. When the channels are concentrated, the content of the accessed channels will be more generalized, which makes it easier for the model to analyze the spatial importance of all pixels, thus facilitating the effectiveness of the final importance weights. Finally, after passing through the two consecutive 3×3 convolution layers, the Sigmoid function induces the values into an interval of [0,1], and outputs the importance weights of channels and pixels $$\left( P_i^1,\ P_i^2 \right).$$

In this process, the contribution of the state parts to the differences between backbone features of different channels and different spatial locations can be thoroughly analyzed and incorporated into the weights.

With the state parts and corresponding importance weights, the essential parts features can be obtained in the following ways:

$$E_i^j = conv\left( concat\left( F_i^j - P_i^j \times S_i^j, F_i^j \right) \right) \tag{1}$$

where, superscript $j \in \{1,2\}$ denotes different sub-branches, the subtraction and multiplication are pixel level, conv denotes 1×1 convolutional layers, concat denotes cascaded operations.

In order to further enhance the features of each of the essential parts, the method of the present embodiment adds a deformable convolution layer. In the default configuration, only the essential feature pair of the fifth layer uses this deformable convolutional layer because it has the most advanced, perfect, and highest-level semantics and is responsible for overall guidance of predictions.

Since the task of the change detection aims to locate the changing regions in the two images, the method of the present embodiment calculates the differences between all essential pairs $D_i$, $i \in = \{2,3,4,5\}$ of the second stage to the fifth stage, as well as the differences between backbone features $D_1$ of the first stage, which are:

$$D_i = E_i^1 - E_i^2, i \in \{2, 3, 4, 5\} \tag{2}$$

$$D_1 = F_1^1 - F_1^2 \tag{3}$$

A function unit of decoding fuses the changing features obtained from each layer by layer. Starting at $D_5$, upsampling it by 2 times, aligning it with $D_4$, and cascading it with $D_4$, the 3×3 convolution layer at the junction will fuse the features of two different semantic levels, and can reduce the aliasing effect caused by different resolutions; then upsampling the output data by 2 times, connecting with $D_3$, and using the 3×3 convolution layer to fuse the two feature maps; then, upsampling the output data by 2 times and connecting with $D_2$, and using the 3×3 convolution layer to fuse the two feature maps; and then, upsampling the output data by 2 times and connecting with $D_1$, and using the 3×3 convolution layer to fuse the two feature maps to obtain the feature map after all features are fused; and finally, using the 1×1 convolution layer to obtain the final changing prediction map.

It should be noted that, in the function unit of decoding, except for the last 1×1 convolutional layer, all convolutional layers have a batch normalization layer after them to help converge, and there is a Leaky ReLU function as the activation function.

Although the model proposed in the present embodiment has a relatively good level of performance when trained on the current dataset, it is believed that it never really understands the concept of "changing" but only tries to find differences with certain features, which is considered to be a form of over-fitting to some extent. Between a pair of input images, all the regions have some differences in most cases, but the network never knows that they were taken in the same place, and it can roughly locate the changing regions because the differences in these regions are somewhat different from the differences in regions that have no essential change. Obviously, this is not the best strategy for training models, so there is a need to let the network master the concept of "changing" to fully exploit the capabilities of deep neural networks.

Therefore, the present embodiment proposes a solution, which is, adding some image pairs with the same background and different foreground to assist in training the network from time to time. The exact same background can alert the network that the pair of images show the scene in the same place, while different foreground objects cause the essential changes of certain areas, so that the deep network can focus on the nature of the "changing".

Specifically, first collecting background images from the Internet as a collection of images $t_0$. Then, clipping foreground regions from images in salient object detection datasets (e.g. dataset of DeepU-Tracker with Similarity learning (DUTS)) and pasting onto the collected background images as images $t_1$ paired with the original background images. Because the salient object detection is a task aimed at detecting salient regions, which tend to be identical to foreground regions, clipping can be done directly using pixel-level labels in the salient object detection dataset, and the truth map GT of salient object detection is the GT of the synthesized virtual dataset. In this way, the training data for extended change detection can be achieved with very little extra labeling time. The resulting dataset may not seem entirely logical to humans, but it can give the network enough distinct semantics of changing to force it to understand the meaning of changing.

The loss function in the method of the present embodiment has two parts, wherein a first part is a cross-entropy loss between the predicted value and the GT. In the pixel classification task, there are significantly more pixels in the invariant regions than in the changing regions, which leads to an imbalance of classes. Thus, the present embodiment employs a weighted cross-entropy loss, where the weight of each class is the proportion of pixels belonging to another class.

In addition, the method of the present embodiment also increases a contrast loss for the essential feature pairs at the fourth and fifth layers. It can push the essential parts of the features of the invariant regions closer, and pull the features of the substantially changing regions farther, so that the changing regions are easier to be established by the decoder below, thus improving the quality of the final prediction. This contrast loss Cont can be calculated as follows:

$$Cont = \begin{cases} D_{x,y}{}' & GT_{x,y} = 1 \\ \max(0, m - D_{x,y}), & GT_{x,y} = 0 \end{cases} \quad (4)$$

where, $D_{x,\,y}$ denotes the difference between the pixels located at (x, y) in the essential feature pairs, for simplicity, the subscript i denoting feature levels is removed here. $GT_{x,\,y}$ is the true value of the pixel, 1 indicating change, 0 indicating unchanged, and m is the residual. When the Euclidean distance between the pixel pair is greater than m, it is considered sufficiently dissimilar and the loss becomes 0.

The complete loss function can be expressed as follows:

$$L = CE(pred, GT) + Cont(D, GT) \quad (5)$$

where, CE denotes weighted cross entropy, pred is the predicted change map.

Figure 3:
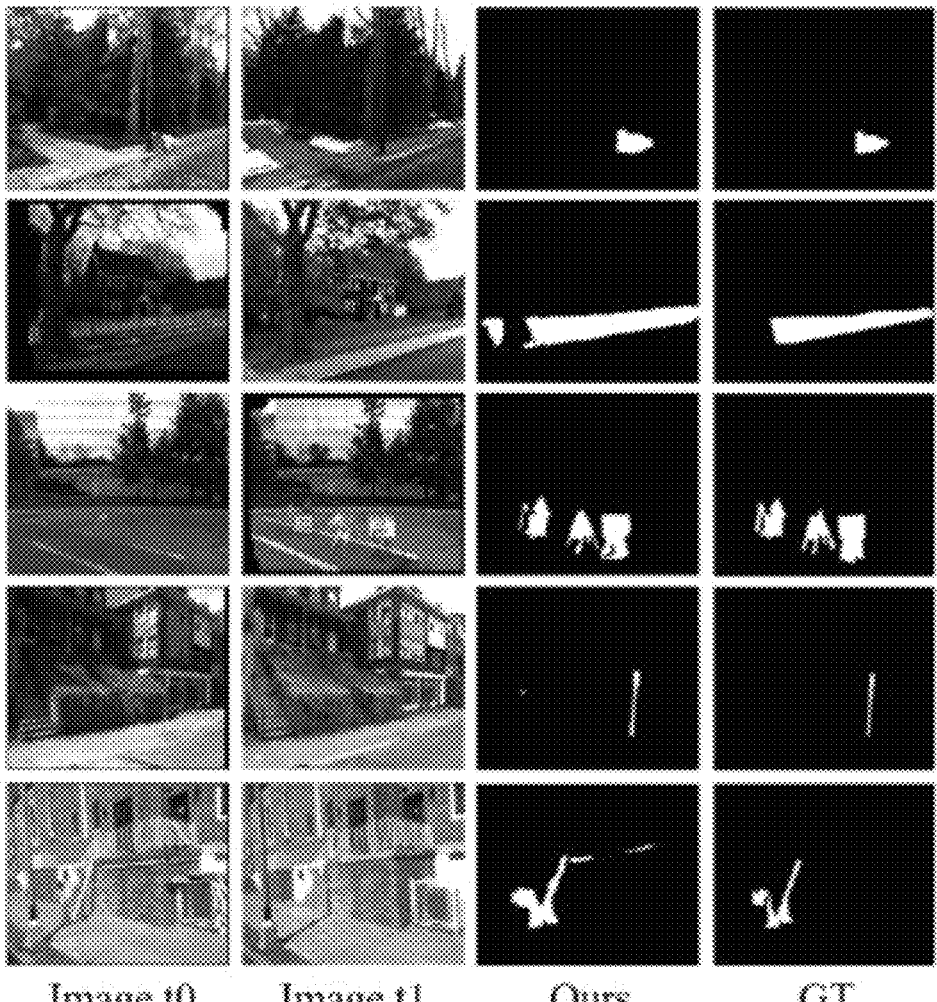
FIG. 3 is a visual contrast diagram of Embodiment 1 of the present invention.

FIG. 3 shows a detection effect of the method of the present embodiment. It can be seen that the method of the present embodiment performs well and is significantly superior to other methods. In particular, the method of the present embodiment can better suppress the expression of non-changing regions and find regions where essential changes have occurred, for example, the falling leaves in the first picture are caused by seasons, which are not the changes sought by the present embodiment, so the method of the present embodiment can suppress all of them very well. In addition, the method of the present embodiment also performs well in positioning and detail, for example, in the third and fourth rows in FIG. 3.

Embodiment 2

The purpose of the present embodiment is to provide a system for detecting changes in area, comprising:
  a low-altitude UAV with an image capture apparatus, configured to: shoot a pre-event image and a post-event image of an area to be detected at different times and at a constant shooting angle at a constant space point based on an UAV control algorithm and a GPS positioning technology, to form a pair of images, i.e., the images acquired at different times of the area to be detected by combining the pre-event image with the post-event image;
  a data-processing and changing-detection apparatus, configured to: process and input the images acquired at different times into a trained change detection model to obtain a result of change detection of images of the area to be detected;
  determining at least one changing feature of the area to be detected by analyzing the result of change detection of images of the area to be detected;
  wherein,
  the data-processing and changing-detection apparatus, comprising:
  a function unit of feature extraction, configured to extract backbone features from the images acquired at different times to obtain multilevel backbone feature pairs;
  a function unit of interaction decoupling, configured to extract state features from the multilevel backbone feature pairs to obtain state feature pairs; obtain state feature weights based on importance degrees of the state features in the images acquired at different times; and, obtain essential feature pairs according to the state feature pairs, the backbone feature pairs, and the state feature weights; and
  a function unit of decoding, configured to perform a cascade fusion on different the essential feature pairs to obtain the result of change detection of images of the area to be detected.

Embodiment 3

It is an object of the present embodiment to provide a computing device comprising a memory, a processor and a computer program stored on the memory and executable on the processor; wherein, when the program is executed by the processor, implementing the steps of the method described above.

Embodiment 4

It is an object of the present embodiment to provide a non-transitory computer-readable storage medium.

The non-transitory computer-readable storage medium having a computer program stored thereon, when the computer program is executed by a processor, implementing the steps of the method described above.

The steps involved in the apparatuses of the above embodiments 2, 3 and 4 correspond to the method of embodiment 1, and the specific implementation mode can be referred to the relevant description part of the embodiment 1. the term "non-transitory computer-readable storage medium" should be understood to include a single medium or multiple media comprising one or more sets of instructions; and should also be understood to include any medium capable of storing, encoding, or carrying a set of instructions for execution by a processor and causing the processor to perform any of the methodologies of the present invention.

those skilled in the art will appreciate that the various function units or steps of the invention described above may be implemented using general purpose computer means, alternatively they may be implemented using program code executable by computing means such that they may be stored in memory means for execution by computing means, or fabricated separately as individual integrated circuit modules, or multiple of them may be fabricated as a single integrated circuit module. The present invention is not limited to any particular combination of hardware and software.

Although the specific embodiments of the present invention are described above in combination with the accompanying drawings, it is not a limitation on the protection scope of the present invention. Those skilled in the art should understand that on the basis of the technical scheme of the present invention, various modifications or deformations that can be made by those skilled in the art without creative labor are still within the protection scope of the present invention.

The invention claimed is:

1. A method for detecting changes in areas, comprising:
acquiring images at different times of an area to be detected by using a low-altitude UAV;
inputting the images acquired at different times into a trained change detection model to obtain a result of change detection of images of the area to be detected; and
determining at least one changing feature of the area to be detected by analyzing the result of change detection of images of the area to be detected; wherein,
the images acquired at different times of the area to be detected by using the low-altitude UAV, comprising:
a pre-event image, obtained by shooting the area to be detected at a spatial point and a shooting angle by using the low-altitude UAV through an UAV control algorithm and a GPS positioning technology; wherein, the spatial point and the shooting angle is recorded; and, a post-event image, obtained by shooting the area to be detected again after a predetermined time interval, at the recorded spatial points and shooting angles by using the low-altitude UAV; and
the inputting the images acquired at different times into the trained change detection model to obtain the result of change detection of images of the area to be detected, comprising:
extracting backbone features from the images acquired at different times to obtain multilevel backbone feature pairs;
extracting state features from the multilevel backbone feature pairs to obtain state feature pairs; obtaining state feature weights based on importance degrees of the state features in the images acquired at different times; and, obtaining essential feature pairs according to the state feature pairs, the backbone feature pairs, and the state feature weights corresponding to the state feature pairs respectively; and
performing a cascade fusion on the essential feature pairs to obtain the result of change detection of images of the area to be detected;
wherein, the extracting the state features from the multilevel backbone feature pairs to obtain the state feature pairs, and obtaining the state feature weights based on the importance degrees of the state features in the images acquired at different times, comprising:
cascading the multilevel backbone feature pairs, and reducing a number of channels of the cascaded multilevel backbone feature pairs by passing through convolution layers, respectively, to obtain the state feature pairs; and
adjusting a number of channels of the state features according to the importance degrees of the state features in the images acquired at different times, to obtain the state feature weights, specifically comprising:

cascading each state in the state feature pairs with corresponding backbone feature;
adjusting a number of channels of cascaded result by passing through a 3×3 convolution layers to be equal to the number of channels of the state feature pairs;
adjusting again the number of channels of the cascaded result that after adjusting the number of channels of the cascaded result by sequentially passing through another two 3×3 convolution layers to be equal to the number of channels of the backbone feature pairs, and obtaining the state feature weights by performing a normalization processing through an activation function;
the obtaining essential feature pairs according to the state feature pairs, the backbone feature pairs, and the state feature weights corresponding to the state feature pairs respectively, specifically comprising:
performing a pixel-level multiplication operation on the state feature weights and corresponding state features to obtain a first result;
performing a pixel-level subtraction operation on the first result and the backbone features corresponding to the state feature weights to obtain a second result; and
performing a cascade operation on the second result and the backbone features corresponding to the state feature weights to obtain a third result, and obtaining the essential features by passing the third result through a 1×1 convolution layer.

2. The method according to claim 1, wherein the performing a cascade fusion on different the essential feature pairs to obtain the result of change detection of images of the area to be detected, specifically comprising: performing fusion on adjacent essential feature pairs layer by layer after upsampling the essential feature pairs, and obtaining the result of change detection of images of the area to be detected by passing a final fusion result through the 1×1 convolution layer.

3. The method according to claim 1, wherein a twin convolutional neural network composed of two VGG16 networks is used to extract the multilevel backbone feature pairs from the images acquired at different times.

4. The method according to claim 1, wherein a process of training a change detection model, comprising:
acquiring background images and foreground regions clipped from images in a salient target detection dataset;
pasting the foreground regions into the background images to forming image pairs with the background images; and
training the change detection model by using a training set constructed from the image pairs and a dataset of the images acquired at different times.

5. A system for detecting changes in area, comprising:
a low-altitude UAV with an image capture apparatus, configured to: shoot a pre-event image and a post-event image of an area to be detected at different times and at a constant shooting angle at a constant space point based on an UAV control algorithm and a GPS positioning technology; forming images acquired at different times of the area to be detected by combining the pre-event image with the post-event image;
a data-processing and changing-detection apparatus, configured to: process and input the images acquired at different times into a trained change detection model to obtain a result of change detection of images of the area to be detected;

determining at least one changing feature of the area to be detected by analyzing the result of change detection of images of the area to be detected;

wherein, the data-processing and changing-detection apparatus is configured to:

extract backbone features from the images acquired at different times to obtain multilevel backbone feature pairs;

extract state features from the multilevel backbone feature pairs to obtain state feature pairs; obtain state feature weights based on importance degrees of the state features in the images acquired at different times; and, obtain essential feature pairs according to the state feature pairs, the backbone feature pairs, and the state feature weights; and perform a cascade fusion on the essential feature pairs to obtain the result of change detection of images of the area to be detected;

wherein, the extracting the state features from the multilevel backbone feature pairs to obtain the state feature pairs, and obtaining the state feature weights based on the importance degrees of the state features in the images acquired at different times, comprising:

cascading the multilevel backbone feature pairs, and reducing a number of channels of the cascaded multilevel backbone feature pairs by passing through convolution layers, respectively, to obtain the state feature pairs; and adjusting a number of channels of the state features according to the importance degrees of the state features in the images acquired at different times, to obtain the state feature weights, specifically comprising:

cascading each state in the state feature pairs with corresponding backbone feature;

adjusting a number of channels of cascaded result by passing through a 3×3 convolution layers to be equal to the number of channels of the state feature pairs;

adjusting again the number of channels of the cascaded result that after adjusting the number of channels of the cascaded result by sequentially passing through another two 3×3 convolution layers to be equal to the number of channels of the backbone feature pairs, and obtaining the state feature weights by performing a normalization processing through an activation function;

the obtaining essential feature pairs according to the state feature pairs, the backbone feature pairs, and the state feature weights corresponding to the state feature pairs respectively, specifically comprising:

performing a pixel-level multiplication operation on the state feature weights and corresponding state features to obtain a first result;

performing a pixel-level subtraction operation on the first result and the backbone features corresponding to the state feature weights to obtain a second result; and performing a cascade operation on the second result and the backbone features corresponding to the state feature weights to obtain a third result, and obtaining the essential features by passing the third result through a 1×1 convolution layer.

6. A computer device comprising: a processor, a memory, and a bus, wherein the memory storing machine-readable instructions executable by the processor, the processor communicating with the memory via the bus when the computer device is operating; wherein, when the machine-readable instructions are executed by the processor, implementing a method for detecting changes in areas according to claim 1.

7. A non-transitory computer-readable storage medium having a computer program stored thereon; wherein, when the computer program is executed by a processor, implementing a method for detecting changes in areas according to claim 1.

* * * * *